US010955040B2

United States Patent
Miller et al.

(10) Patent No.: US 10,955,040 B2
(45) Date of Patent: Mar. 23, 2021

(54) TOOTH GAP RELIEVED ENVELOPING WORM

(71) Applicants: Kenneth D. Miller, Statesville, NC (US); Kyle Zech, Phoenix, AZ (US)

(72) Inventors: Kenneth D. Miller, Statesville, NC (US); Kyle Zech, Phoenix, AZ (US)

(73) Assignee: KINEMATICS, LLC, Huntington Beach, CA (US)

( * ) Notice: Subject to any disclaimer, the term of this patent is extended or adjusted under 35 U.S.C. 154(b) by 128 days.

(21) Appl. No.: 16/363,000

(22) Filed: Mar. 25, 2019

(65) Prior Publication Data

US 2019/0301584 A1 Oct. 3, 2019

Related U.S. Application Data

(60) Provisional application No. 62/648,637, filed on Mar. 27, 2018.

(51) Int. Cl.
| *F16H 55/17* | (2006.01) |
| *F16H 55/22* | (2006.01) |
| *F16H 55/08* | (2006.01) |
| *B23F 11/00* | (2006.01) |

(52) U.S. Cl.
CPC .......... *F16H 55/0853* (2013.01); *B23F 11/00* (2013.01); *F16H 55/22* (2013.01)

(58) Field of Classification Search
CPC ...... F16H 55/22; F16H 55/08; F16H 55/0853; B23F 11/00
See application file for complete search history.

(56) References Cited

U.S. PATENT DOCUMENTS

| 2,756,641 | A | * | 7/1956 | Skog | B23F 19/002 409/39 |
| 5,522,278 | A | * | 6/1996 | Panjuchin | B23F 21/00 74/424.7 |
| 5,605,071 | A | * | 2/1997 | Buchanan, Jr. | F16H 1/16 188/134 |
| 6,176,148 | B1 | * | 1/2001 | Zhang | F16H 1/16 74/425 |
| 6,247,376 | B1 | * | 6/2001 | Zhou | B21H 5/005 29/893.31 |
| 6,745,640 | B2 | * | 6/2004 | Nguyen | F16H 1/16 74/425 |
| 7,083,496 | B2 | * | 8/2006 | Yanase | B23F 23/1225 451/47 |
| 2007/0137352 | A1 | * | 6/2007 | Hrushka | F16H 1/16 74/425 |
| 2013/0089386 | A1 | * | 4/2013 | Fong | B23F 13/02 409/48 |

* cited by examiner

*Primary Examiner* — Jake Cook
(74) *Attorney, Agent, or Firm* — Ahmadshahi & Associates

(57) ABSTRACT

A worm comprises enveloping worm teeth having relieved ends. The worm is machined in three steps comprising machining a threaded section, machining a first end section, and machining a second end section. The threaded section is machined utilizing a rack-form tool having a rack-form thickness. The first end section and the second end section are machined utilizing a larger rack-form thickness, thereby, providing relieved ends. The teeth of the worm having such relieved ends mesh with the teeth of a mating gear at full depth throughout preventing partial teeth engagement.

8 Claims, 5 Drawing Sheets

TOOTH GAP RELIEVED ENVELOPING WORM

CROSS REFERENCE TO RELATED APPLICATIONS

The present patent application is a formalization of a previously filed provisional patent application entitled "Tooth Gap Relieved Enveloping Worm," filed on Mar. 27, 2018, as U.S. patent application Ser. No. 62/648,637 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to worm and gear, such as those used in slew drives, where the worm comprises enveloping teeth which engage multiple pitches of the mating gear. In particular, the worm comprises a threaded section machined utilizing a rack-form tool having a first rack-form thickness, a first end section and a second end section at either end of the worm thread which are machined utilizing the rack-form tool having a second rack-form thickness. By selecting the second rack-form thickness to be larger than the first rack-form thickness, the worm will have widened tooth gaps at either end that disallow tooth contact in the end areas where the break out portion of the worm thread is less than full tooth.

BACKGROUND

Conventional enveloping worm tooth mesh with the mating gear which has an inherent partial tooth engagement at the beginning of the mesh cycle where the worm thread starts to mesh with the gear teeth. This is undesirable because the mesh progression of the worm is from no tooth at all to full depth of tooth mesh. This is due to the shape of the composite worm tooth form being throated or enveloping (narrow at its center, larger at the ends) such that it wraps around the mating gear. The Worm thread shape is superimposed onto a cylindrical blank (see FIG. 1B, section view). The tooth slot where the thread begins arcing through the blank begins with no tooth (blank outside diameter) to full tooth depth of the design. When mated to the gear, the conjugate mesh begins at the first contact of the partial tooth and progresses to full tooth depth. Since all gear teeth deflect under loading, this phenomenon causes degradation and wear of the mating part of lesser material hardness as the worm tooth tends to "shave" the mating gear tooth.

The present method of machining the worm describes a means of relieving the portion of worm mesh that has partial tooth engagement. The net effect of this worm tooth relief modification is to prevent tooth mesh contact between the worm and gear until full depth of mesh is realized preventing partial engagement.

SUMMARY

In one aspect, a worm is disclosed wherein the worm is made from a worm blank, said worm blank comprising a length thereby defining a center point, an axial axis along the length and through the center point, and a positive direction and a negative direction along the axial axis and about the center point, said worm comprising a threaded section made by machining the worm blank into a conjugate worm comprising a conjugate-thread length along the axial axis thereby defining a conjugate-thread center point that coincides with the center point, a positive half-conjugate length in the positive direction, and a negative half-conjugate length in the negative direction, via, a rack-form tool utilizing a first rack-form thickness, a first end section made by machining the conjugate worm starting at the positive half-conjugate length for a first predetermined length in the positive direction, via the rack-form tool utilizing a second rack-form thickness, and a second end section made by machining the conjugate worm starting at the negative half-conjugate length for a second predetermined length in the negative direction, via the rack-form tool utilizing the second rack-form thickness.

Preferably, the conjugate-thread length is equal to 24 inches.

Preferably, the positive half-conjugate length is equal to the negative half-conjugate length which is equal to ½ the conjugate-thread length.

Preferably, the first predetermined length is equal to the second predetermined length which is equal to 3 inches.

Preferably, the first rack-form thickness is equal to 0.25 inches.

Preferably, the second rack-form thickness is equal to 0.35 inches.

Preferably, the worm blank is machined into the conjugate worm via a CNC turning lathe.

Preferably, the conjugate worm comprises enveloping worm teeth. Preferably, the worm blank is machined into the conjugate worm according to equations;

$Ratio = N_G \div N_W;$ $R = Module \times N_G \div \cos H \div 2;$ $P = 2R \times \pi \div N_G;$ and $A_T = \tan^{-1}(\tan A_N \div \cos H);$ and wherein,
$N_G$=number of teeth in a gear;
$N_W$=number of enveloping worm teeth in the worm;
$A_N$=normal pressure angle;
$A_T$=transverse pressure angle;
R=operating pitch radius;
P=transverse circular pitch;
H=helix angle;
$A_R$=rack form addendum; and
T=rack-form thickness.

In another aspect, a method of making a worm from a worm blank is disclosed wherein said worm blank comprises a length thereby defining a center point, an axial axis along the length and through the center point, and a positive direction and a negative direction along the axial axis and about the center point, said method comprising machining the worm blank into a conjugate worm comprising a conjugate-thread length along the axial axis thereby defining a conjugate-thread center point that coincides with the center point, a positive half-conjugate length in the positive direction, and a negative half-conjugate length in the negative direction, via, a rack-form tool utilizing a first rack-form thickness, machining the conjugate worm starting at the positive half-conjugate length for a first predetermined length in the positive direction, via the rack-form tool utilizing a second rack-form thickness, and machining the conjugate worm starting at the negative half-conjugate length for a second predetermined length in the negative direction, via the rack-form tool utilizing the second rack-form thickness.

Preferably, the conjugate-thread length is equal to 24 inches.

Preferably, the positive half-conjugate length is equal to the negative half-conjugate length which is equal to ½ the conjugate-thread length.

Preferably, the first predetermined length is equal to the second predetermined length which is equal to 3 inches.

Preferably, the first rack-form thickness is equal to 0.25 inches.

Preferably, the second rack-form thickness is equal to 0.35 inches.

In another aspect, a method of making a worm from a conjugate worm is disclosed wherein the conjugate worm is machined via a rack-form tool utilizing a first rack-form thickness and wherein said conjugate worm comprises a conjugate-thread length thereby defining a conjugate-thread center point, and axial axis along the conjugate-thread length and through the conjugate-thread center point, and a positive direction and a negative direction along the axial axis and about the conjugate-thread center point, a positive half-conjugate length in the positive direction, and a negative half-conjugate length in the negative direction, said method comprising, machining the conjugate worm starting at the positive half-conjugate length for a first predetermined length in the positive direction, via the rack-form tool utilizing a second rack-form thickness.

Preferably, the method further comprises machining the conjugate worm starting at the negative half-conjugate length for a second predetermined length in the negative direction, via the rack-form tool utilizing the second rack-form thickness.

Preferably, the positive half-conjugate length is equal to the negative half-conjugate length which is equal to ½ the conjugate-thread length.

Preferably, the first predetermined length is equal to the second predetermined length which is equal to ⅛ of the conjugate-thread length.

Preferably, the second rack-form thickness is equal to 1.40 times the first rack-form thickness.

DETAILED DESCRIPTION OF THE PRESENTLY PREFERRED EMBODIMENTS

Figure 1A:
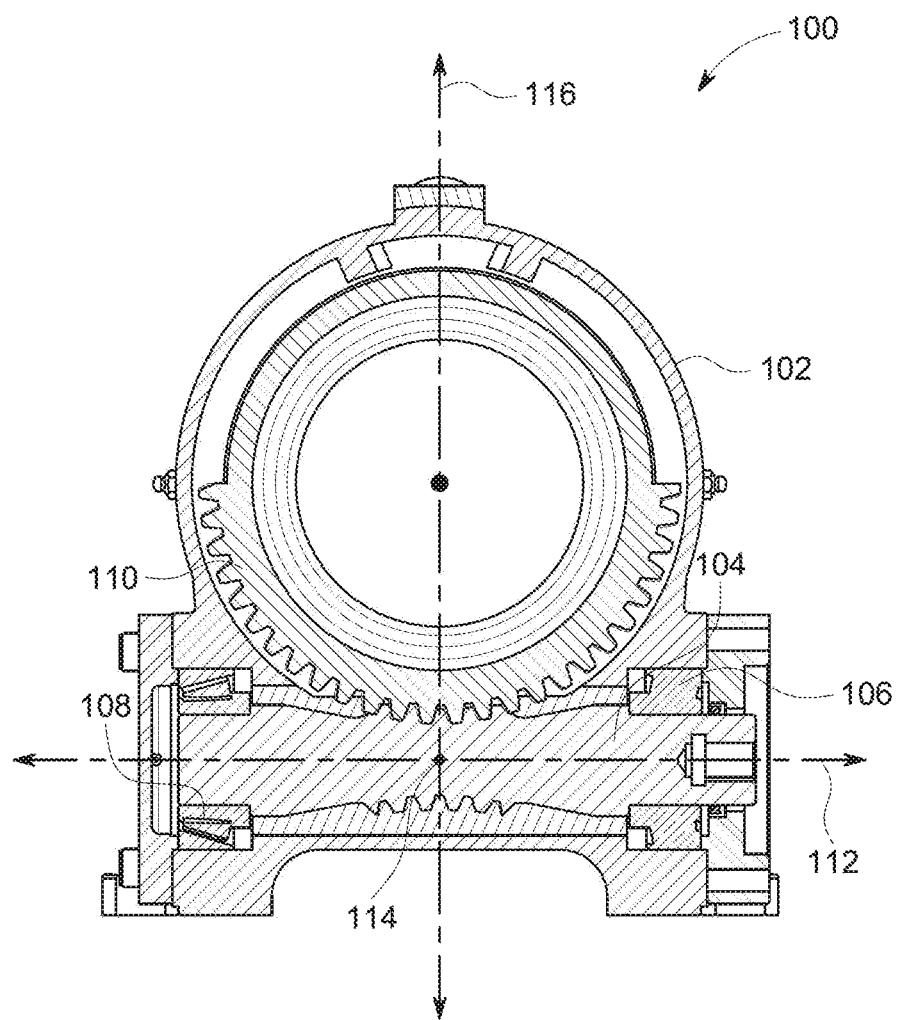
FIG. 1A shows a front cross-sectional view of a slew drive comprising a conventional conjugate worm having enveloping teeth that mesh with the teeth of a mating gear.

FIG. 1A depicts a front cross-sectional front view of a slew drive 100 comprising a conventional conjugate worm 104 whose enveloping teeth are meshed with the teeth of a mating gear 110. The conjugate worm 104 and the gear 110 are secured in a housing 102. The conjugate worm 104 is further secured to the housing 102 via two roller bearings 106 and 108.

The conjugate worm 104 has been machined from a worm blank via a CNC turning lathe. The CNC turning lathe is a machining device implementing Computer Numerical Control (CNC) to cut (machine) the worm blank into the conjugate worm 104. The worm blank has a length thereby defining a center point that coincides with a conjugate-thread center point 114 of the conjugate worm, and an axial axis 112 along the length and through the center point further showing the positive and negative direction of the axis 112 about the center point 114.

The conjugate worm 104 and the gear 110 are engaged and mechanical power is transmitted from the conjugate worm 104 to the gear 110 via their respective teeth. The forces developed during the transmission of mechanical power between the conjugate worm 104 and the gear 110 exert stresses in the teeth causing wear. In the enveloping worm design, the teeth of the conjugate worm 104 have a contour which increases the surface area which is in contact with the teeth of the gear 110 thereby reducing the stress.

The conjugate worm 104 has a threaded section that includes a conjugate-thread length along the axis 112 centered at the center point. In the areas of the two far two ends of the threaded section, the teeth depths are shallow and hence are not in full depth engagement with the teeth of the gear 110. These ends can be machined again to remove flank material thereby widening the worm tooth slot to ensure that teeth engagement between the worm teeth and the gear teeth occur only at full depth of the worm tooth.

Figure 1B:
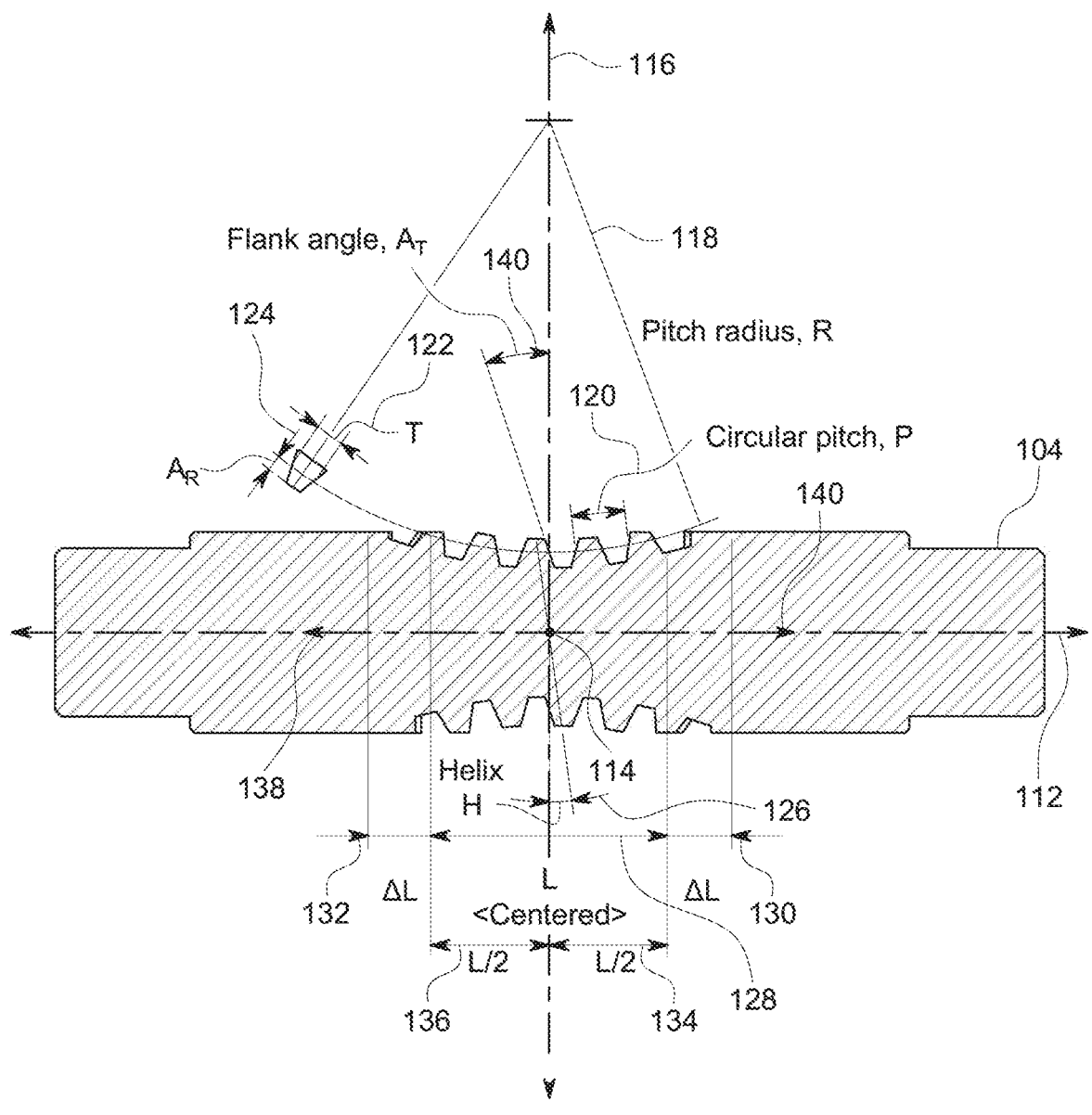
FIG. 1B shows a front cross-sectional view of the conjugate worm, shown in FIG. 1, having a conjugate-thread length L and enveloping teeth that have been machined via a rack-form tool utilizing a rack-form thickness T.

FIG. 1B depicts a front cross-sectional view of the conjugate worm 104, shown in FIG. 1 showing the details of the design. The conjugate worm 104 has a threaded section comprising a conjugate-thread length L at 128 along the axis 112 and a conjugate-thread center point 114 that coincides with the center point of the worm blank. The conjugate-thread length 128 defines a positive half-conjugate length L/2 at 134 in the positive direction at 140, and a negative half-conjugate length L/2 at 136 in the negative direction at 138. The conjugate worm 104 includes enveloping teeth which have been obtained by machining the worm blank, using a CNC turning lathe, via a rack-form tool utilizing a rack-form thickness T at 122. The two ends of the threaded section, in the region of ΔL on both sides at 130 and 132, the teeth do not have full depth.

Meshing engagement between the teeth of the conjugate worm 104 and the gear 110 in the regions L/2 to L/2+ΔL and −L/2 to −L/2−ΔL create shearing action on the gear teeth as the teeth of the worm 104 phases from zero depth to full depth with the gear 110 causing unnecessary wear of the gear teeth. Removing flank material in these regions relives stress by ensuring that teeth engagement occurs only at full depth. In an illustrative example, the conjugate worm 104 is machined from a worm blank using a CNC turning lathe that has been programmed according to equations:

$$Ratio = N_G \div N_W;$$

$$R = Module \times N_G \div \cos H \div 2;$$

$$P = 2R \times \pi \div N_G; \text{ and}$$

$$A_T = \tan^{-1}(\tan A_N \div \cos H); \text{ and}$$

wherein, $N_G$=number of teeth in the gear;
$N_W$=number of enveloping worm teeth in the worm;
$A_N$=normal pressure angle;
$A_T$ at 140=transverse pressure angle;
R at 118=operating pitch radius;
P at 120=transverse circular pitch;
H at 126=helix angle;
$A_R$ at 124=rack form addendum; and
T at 122=rack-form thickness.

Figure 2:
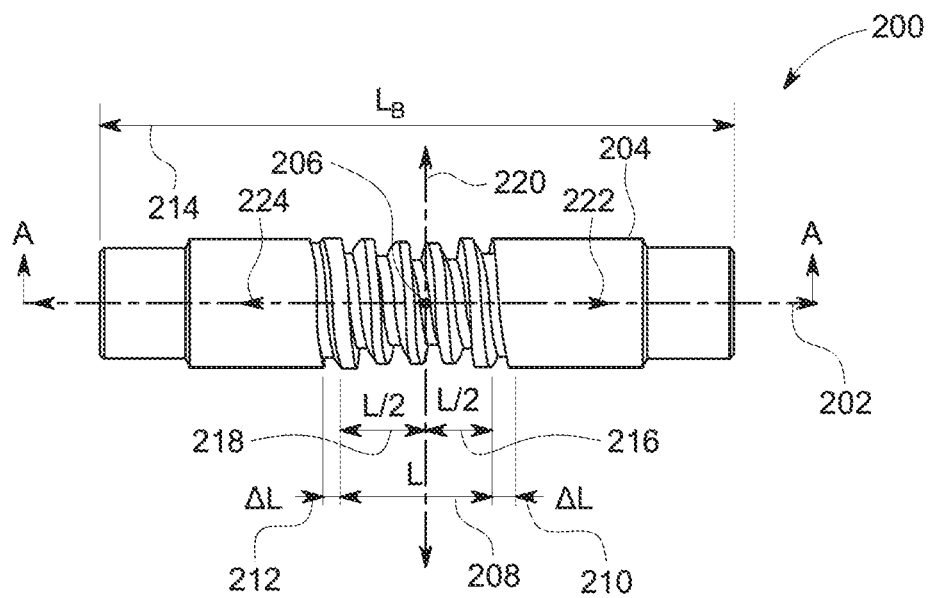
FIG. 2 shows a front view of a preferred embodiment of a worm comprising a threaded section having a conjugate-thread length L and machined utilizing a rack-form thickness T, and two relieved ends of length ΔL and machined utilizing a rack-form thickness T+ΔT.

FIG. 2 depicts a front view of a preferred embodiment of a worm 200 that has been made from a worm blank. The worm blank comprises a length $L_B$ at 214 defining a center point, an axial axis 202 along the length 214 and through the center point, a positive direction 222 and a negative direction 224 along the axis 202 and about the center point. The center point is at the intersection of a normal axis 220 and the axial axis 202.

The worm 200 is made from the worm blank by three machining operations. The first operation generates a threaded section, the second operation generates a first end section, and the third operation generates a second end section. The threaded section is machined according to conventional methods used to produce conjugate worms such as the one depicted in FIGS. 1A and 1B.

The threaded section comprises a conjugate-thread length L at 208 along the axis 202, a conjugate-thread center point 206, a positive half-conjugate length L/2 at 216 in the positive direction 222, a negative half-conjugate length L/2 at 218 in the negative direction 224. The threaded section has been machined via a rack-form tool utilizing a first rack-form thickness T.

The first end section is cut during the second machining operation. Specifically, the first end section is machined utilizing a second rack-form thickness and for a distance beginning at +L/2 for a first predetermined length in the positive direction 222. The first predetermined length may be an arbitrary value or selected to be equal to ΔL at 210.

Finally, the second end section is cut during the third machining operation by utilizing the second rack-form thickness. The machining is performed beginning at −L/2 for a second predetermined length in the negative direction 224. The second predetermined length may be an arbitrary value or selected to be equal to the first predetermined value.

Figure 3:
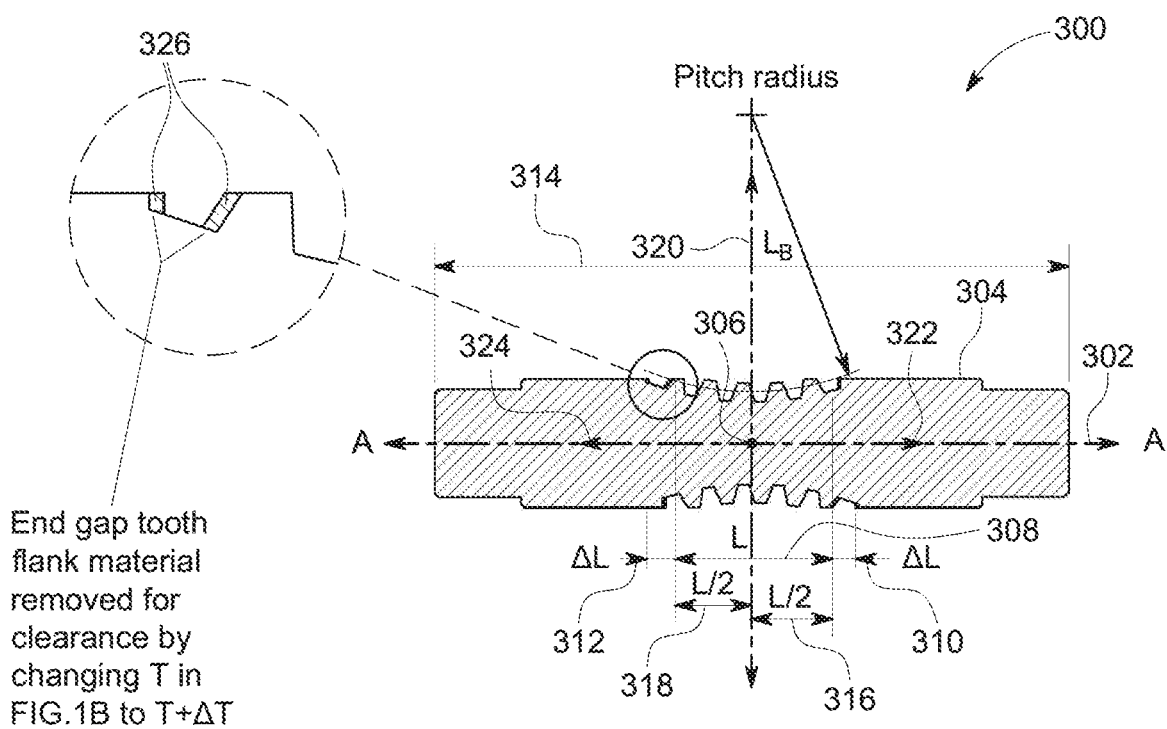
FIG. 3 shows a front cross-sectional view of a preferred embodiment of a worm, such as the one shown in FIG. 2, illustrating the removal of tooth flank material within the two relieved ends.

FIG. 3 depicts a front cross-sectional view of a preferred embodiment of a worm, 300 such as the one shown in FIG. 2, illustrating the removal of tooth flank material within the first end section and the second end section during the second and third machining operations. Similar to FIG. 2 the worm 300 has been made from a worm blank comprising a length $L_B$ at 314 defining a center point, an axial axis 302 along the length 314 and through the center point, a positive direction 322 and a negative direction 324 along the axis 302 and about the center point being at the intersection of a normal axis 320 and the axial axis 302.

The threaded section comprises a conjugate-thread length L at 308 along the axis 302, a conjugate-thread center point 306, a positive half-conjugate length L/2 at 316 in the positive direction 322, a negative half-conjugate length L/2 at 318 in the negative direction 324. The threaded section has been machined via a rack-form tool utilizing a first rack-form thickness T. In another preferred embodiment, the positive half-conjugate length is equal to the negative half-conjugate length which is equal to ½ the conjugate-thread length or 12 inches.

The first end section is cut during the second machining operation. Specifically, the first end section is machined utilizing a second rack-form thickness that is larger, for instance by ΔT, than the first rack-form thickness T to remove tooth flank material. The machining operation begins +L/2 for a first predetermined length in the positive direction 322. The first predetermined length may be an arbitrary value or selected to be equal to ΔL at 310. In a preferred embodiment, the first predetermined length is equal to 3 inches.

The second end, section is cut during the third machining operation by utilizing the second rack-form thickness. The machining is performed beginning at −L/2 for a second predetermined length in the negative direction 324. Tooth flank material at 326 is removed by this operation. In another preferred embodiment, the second predetermined length is equal to the first predetermined length the first rack-form thickness is equal to 0.25 inches, and the second rack-form thickness is equal to 0.35 inches.

Figure 4:
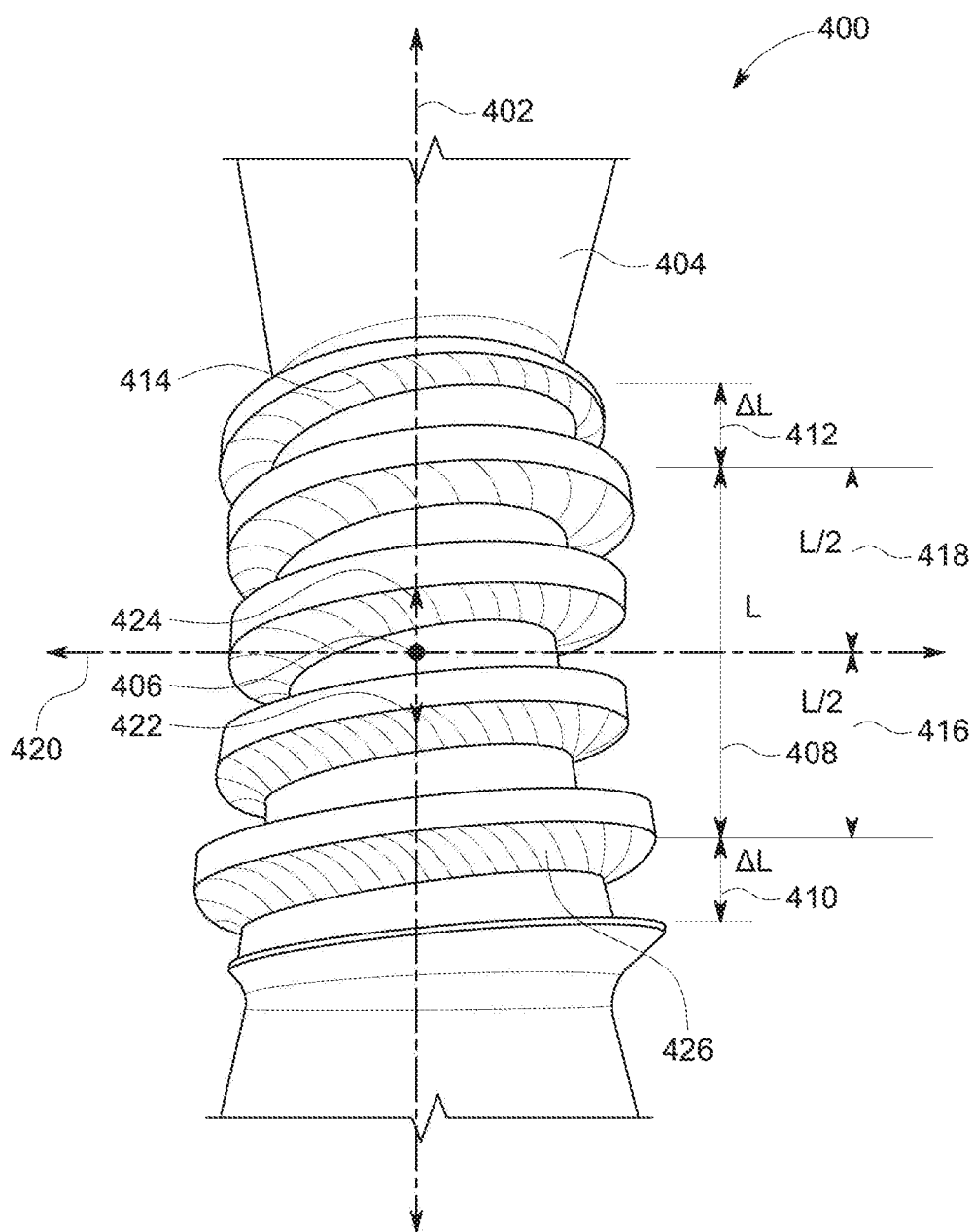
FIG. 4 shows a prospective view of a conventional conjugate worm, such as the one shown in FIG. 1A and FIG. 1B, illustrating a typical wear pattern throughout the threaded section that is created from, meshing of the teeth of the conjugate worm and the teeth of a mating gear.

FIG. 4 depicts a prospective view of a conventional conjugate worm 400, such as the one shown in FIG. 1A and FIG. 1B. The conjugate worm 400 exhibits, a typical wear pattern throughout its threaded section caused by the meshing of the teeth of the conjugate worm 400 and the teeth of a mating gear such as the gear 110 shown in FIG. 1A.

The conjugate worm 400 has a threaded section comprising a conjugate-thread length L at 408 along an axial axis 402 and a conjugate-thread center point 406. The conjugate-thread length 408 comprises a positive half-conjugate length L/2 at 418 in the positive direction at 424, a negative half-conjugate length L/2 at 416 in the negative direction at 422. The conjugate worm 400 includes enveloping teeth which have been obtained by machining a worm blank, using a CNC turning lathe, via a rack-form tool utilizing a rack-form thickness T. The two ends of the threaded section, in the region of ΔL on both sides at 412 and 410, the teeth do not have full depth. Meshing engagement between the teeth of the conjugate worm 400 and a mating gear produces a meshing contact pattern throughout the threaded section. In particular, contact pattern can be seen in the region L/2 to L/2+ΔL at 414, and in the region −L/2 to −L/2−ΔL at 426.

Figure 5:
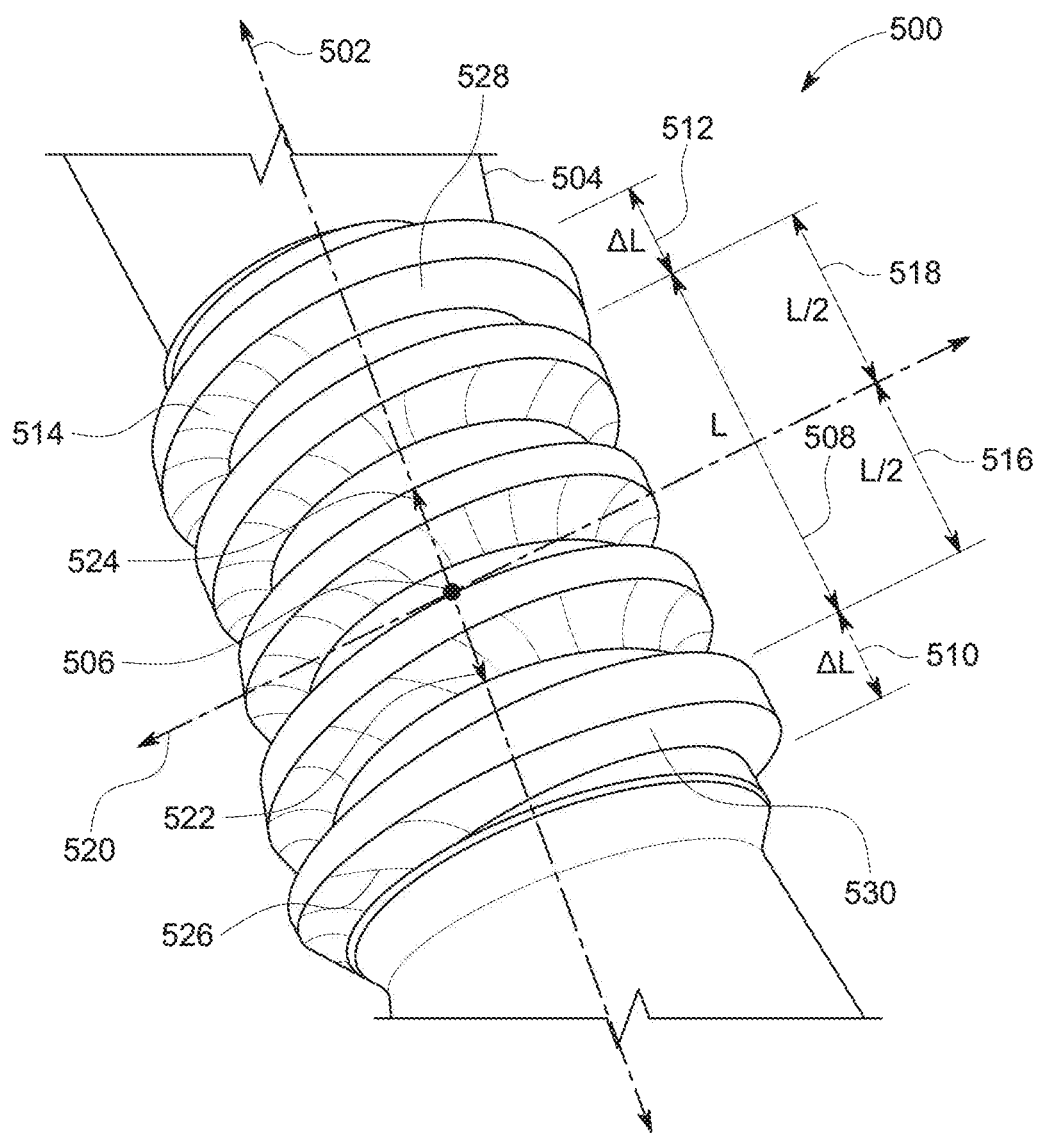
FIG. 5 shows a prospective view of a preferred embodiment of a worm, such as the one shown in FIG. 2 or FIG. 3, illustrating lack of wear in the relieved ends until full teeth engagement is achieved.

FIG. 5 depicts a prospective view of a preferred embodiment of a worm 500, such as the one shown in FIG. 2 or FIG. 3, illustrating lack of wear in the relieved ends until full depth of the worm tooth engagement is achieved. The worm 500 has a threaded section that has been machined utilizing a rack-form thickness T. The threaded section comprises a conjugate-thread length L at 508 along an axial axis 502 and a conjugate-thread center point 506. The conjugate-thread length 508 comprises a positive half-conjugate length L/2 at 518 in the positive direction at 524, a negative half-conjugate length L/2 at 516 in the negative direction at 522. The worm 500 has a first end section that has been machined in a second step utilizing a rack-form thickness of T+ΔT in the region of ΔL. Compared to FIG. 4, lack of contact pattern in this region is shown at 528. A second end section of the worm 500 that has been machined in a third step utilizing the rack-form thickness of T+ΔT in the region of ΔL also demonstrates lack of contact pattern at 530.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A worm made from a worm blank, said worm blank comprising a length thereby defining a center point, an axial axis along the length and through the center point, and a positive direction and a negative direction along the axial axis and about the center point, said worm comprising:
   (a) a threaded section made by machining the worm blank into a conjugate worm comprising a conjugate-thread length along the axial axis thereby defining a conjugate-thread center point that coincides with the center point, a positive half-conjugate length in the positive direction, and a negative half-conjugate length in the negative direction, via a rack-form tool utilizing a first rack-form thickness;
   (b) a first end section made by machining the conjugate worm starting at the positive half-conjugate length for a first predetermined length in the positive direction, via the rack-form tool utilizing a second rack-form thickness;
   (c) a second end section made by machining the conjugate worm starting at the negative half-conjugate length for a second predetermined length in the negative direction, via the rack-form tool utilizing the second rack-form thickness; and
   wherein the worm blank is machined into the conjugate worm according to equations:

$Ratio = N_G \div N_W;$ $R = Module \times N_G \div \cos H \div 2;$ $P = 2R \times \pi \div N_G;$ and $A_T = \tan^{-1}(\tan A_N \div \cos H);$ and wherein,
   $N_G$ = number of teeth in a gear;
   $N_W$ = number of enveloping worm teeth in the worm;
   $A_N$ = normal pressure angle;
   $A_T$ = transverse pressure angle;
   R = operating pitch radius;
   P = transverse circular pitch;
   H = helix angle;
   $A_R$ = rack form addendum; and
   T = rack-form thickness.

2. The worm of claim 1, wherein the conjugate-thread length is equal to 24 inches.

3. The worm of claim 1, wherein the positive half-conjugate length is equal to the negative half-conjugate length which is equal to ½ the conjugate-thread length.

4. The worm of claim 1, wherein the first predetermined length is equal to the second predetermined length Which is equal to 3 inches.

5. The worm of claim 1, wherein the first rack-form thickness is equal to 0.25 inches.

6. The worm of claim 1, wherein the second rack-form thickness is equal to 0.35 inches.

7. The worm of claim 1, wherein the worm blank is machined into the conjugate worm via a CNC turning lathe.

8. The worm of claim 1, wherein the conjugate worm comprises enveloping worm teeth.

* * * * *